Patented Apr. 28, 1936

2,038,733

UNITED STATES PATENT OFFICE 2,038,733

DOUGH DIVIDER

Laurence Seymour Harber and John Edward Pointon, Peterborough, England, assignors to Baker Perkins Company, Inc., Saginaw, Mich., a corporation of New York Application February 16, 1935, Serial No. 6,767
In Great Britain March 9, 1934

5 Claims. (Cl. 107—15)

This invention relates to dough dividers of the type employing a cut-off knife and a charging ram.

Its objects and the mode of accomplishing them are, to divide dough with a high degree of accuracy as to weight, even though the machine may employ a large number of measuring chambers; to provide an air seal between the ram chamber and the marginal areas of the dough mass in the feed hopper; to reduce felling action on the dough by providing a ram arrangement such that while charging the measuring chambers the ram shall reduce the cubical capacity of its chamber to a minimum thus leaving very little dough which is subjected to the pressure of more than one ram stroke.

A further object is to avoid either a dead suction effect or a tendency to draw dough from the hopper through a narrow opening. This object is attained by providing means for moving the ram and knife forward for a charging stroke simultaneously, the ram face being in substantial register with the knife edge for a substantial proportion of a stroke (for example in excess of half the stroke), arresting (or substantially arresting) the ram while the knife proceeds to cut off the dough, again moving the ram forward for charging the measuring chambers, allowing a rest period while the measuring chambers are discharged, and then retreating both ram and knife together in substantial register. The means for moving the ram and knife in such relationship includes a cam operating through a very flexible spring and preferably through an articulated lever.

In the accompanying drawings.

Figure 1:
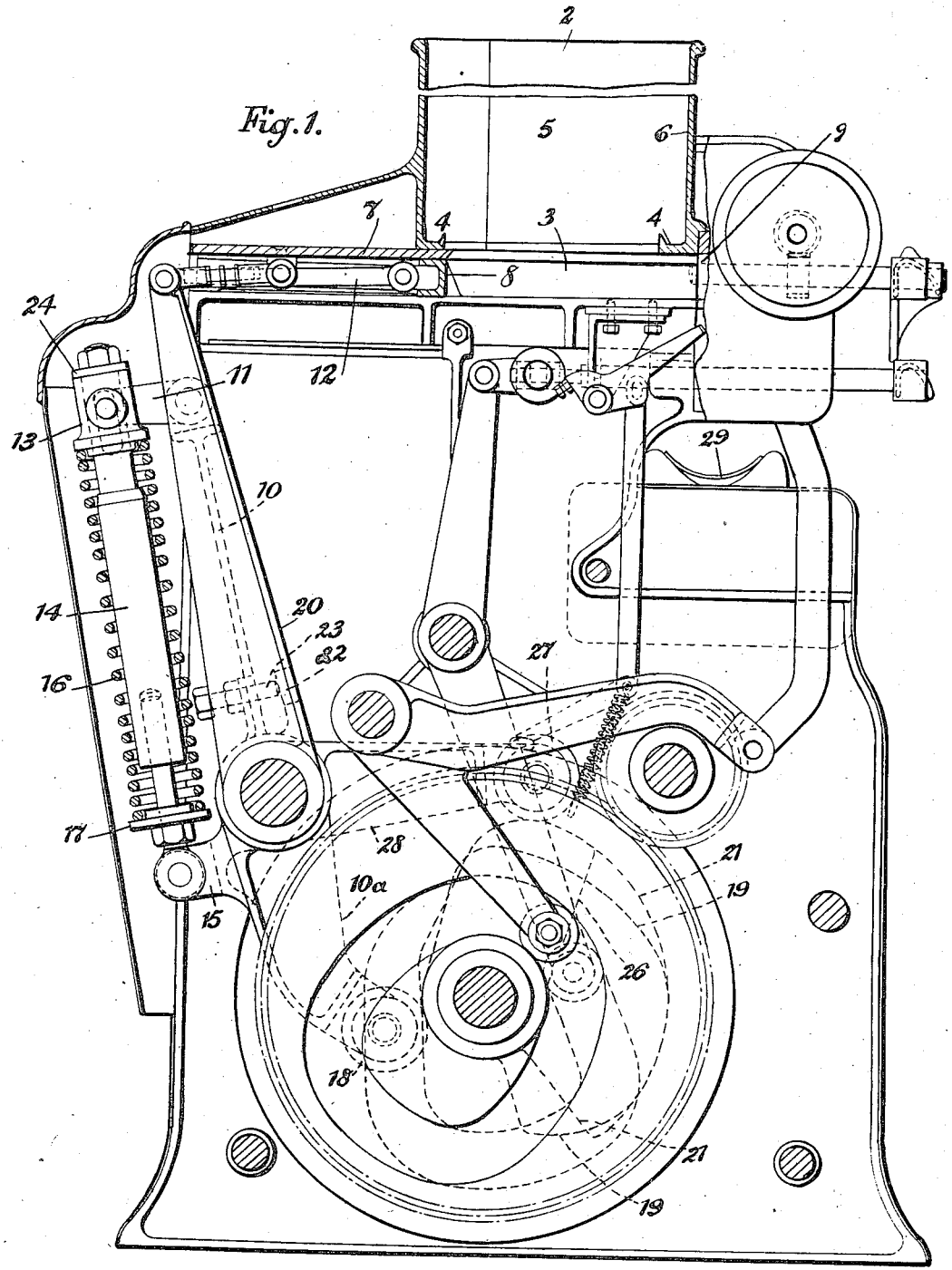
Fig. 1 is a side elevation partly in section of a dough divider incorporating the stated improvements.
Figure 2:
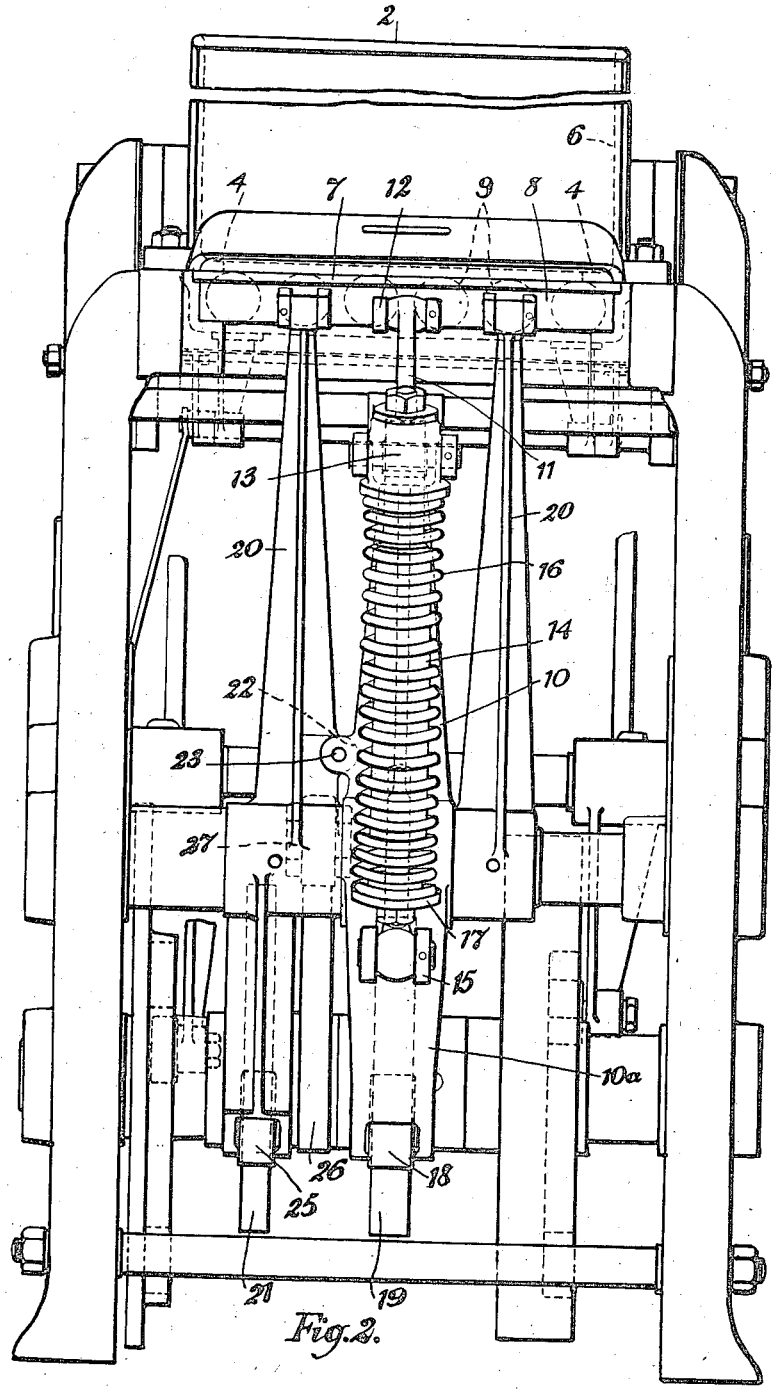
Fig. 2 is an end elevation as viewed from the left-hand side of Fig. 1.

In carrying the invention into effect according to one convenient mode which will be described by way of example, instead of providing a hopper of the usual elongated rectangular form in plan, a hopper 2 of more or less square shape in plan is employed. The square form of hopper encourages the dough to take the shape thereof readily and to sink under gravity action so that uniform and reliable feed or extrusion into the ram chamber is effected.

The ram chamber is of corresponding shape in plan to that of the feed hopper and supplies the dough to two or more measuring chambers with or without the aid of a die plate.

A flange 4 projects inwardly, for example, an inch or so from the lower extremity of the hopper where it adjoins the ram chamber 3. Instead of a flange the hopper may have an inwardly curved lip in this region but in either case the formation is such as to enable the dough as it sinks in the hopper to make a complete contact around the periphery of the flange or lip. Thus the dough bulk forms an air seal between the hopper and the ram chamber. The inner perimeter of the flange defines the opening into the ram chamber. While it is preferred to provide such a sealing flange on all sides of the hopper, it may be arranged on the forward side and the lateral sides only, it being important to obtain the air sealing effect particularly adjacent the measuring chambers. The sealing flanges on the lateral faces 5 may extend only along part of the wall, joining the flange on the forward face 6.

The flanges may be formed integrally with the hopper walls or may be secured thereto in any convenient manner, and at any convenient height on the walls instead of in the position shown. The flange lip may be curved upwardly at its inner edge or may be provided with an upwardly extending bead.

A reciprocating dough cut-off knife 7 is provided immediately below the flange 4, and below the latter a reciprocating ram 8 is located. The forward face of the ram 8 is preferably bevelled to prevent the formation of a pocket and to still further reduce the quantity of dough left in front of the ram at the end of its forward stroke, and to reduce the felling effect. Measuring chambers 9 are located at the forward side of the ram chamber with or without an intermediate die plate. It has been found that the divider will operate accurately with as many as six or more measuring chambers.

The ram operating means comprises a main lever 10 mounted on a horizontal axis and operated by a cam to be described hereinafter. At the upper end of the lever and between it and the rear of the ram an articulated part in the form of a bell crank lever 11 pivotally mounted on the main lever is provided. One end of the bell crank 11 is connected to the ram by a connecting rod 12 and the other end is pivotally connected to a collar 13 slidably mounted on a rod 14 arranged substantially parallel with and behind the main lever. The lower end of the rod 14 is pivotally mounted on an extension 15 of the main ram lever.

A long very flexible spring 16 surrounds the rod 14 and is compressed a substantial distance compared to its free length. The lower end of the spring abuts against a collar 17 fixed upon the rod. The spring 16 exerts substantially uniform pressure through the ram upon the dough. A spring is selected which when substantially compressed affords a pressure of about 12 pounds per square inch on the dough. The end of the bell crank lever when the ram is operating, say, upon two-pound dough pieces, causes the spring to be compressed very slightly further (compared with the original compression), whilst when operating upon one-pound pieces a still further compression occurs, but the total compression when operating between 1 and 2 pounds is relatively quite small compared to the original compression and results in only a very slight variation of pressures on the dough according to the weight of dough pieces being scaled.

The main lever 10 has an arm extension 10a at its lower end on which a cam roller 18 is mounted in contact with a ram-operating cam 19. This cam is provided with lobes of a contour appropriate to control the forward movements of the ram 8 as indicated above and terminates or is cut away for a portion corresponding with the return stroke of the ram so that the cam 19 has no influence upon the ram during this period.

The knife 7 is actuated by a lever 20 (or pair of levers mounted one on either side of the ram lever) and controlled by a cam 21 engaging a roller 25 on the lever in known manner to give the knife a continuous forward movement, a portion of which is synchronous with the ram movement. The return movement of the knife is effected by a second cam 26 engaging a roller 27 on an arm 28 connected to the lever 20.

The knife lever (or one of them) has a lateral lug 22 adapted to engage an adjustable stop 23 mounted on a corresponding lug upon the side of the main ram lever 10 on the return stroke of the knife so that the ram lever during this period, when it is out of control of its own cam, is moved back into its initial position by the knife lever 20.

In operation, according to the arrangement shown, cam 19 moves ram 8 forward with the knife 7 for a substantial portion of the total stroke while lever spring 16, operating through the bell crank lever 11, exerts at this time a constant pressure of about 12 pounds per square inch. Some of the dough which has sunk into the ram chamber 3 is pushed back into the hopper during this portion of the stroke and tends to break up any large pockets of fermentation gases, which action assists in maintaining accuracy of scaling. On the completion of this part of the stroke cam 19 brings lever 10 and ram 8 to rest while knife 7 proceeds to cut off the dough remaining in the ram chamber from that in the hopper. Cam 19 then operates to complete the ram stroke, the pressure exerted by the spring 16 being increased by about 1 or 2 pounds per square inch, according to whether the measuring chambers are adjusted for one-pound or two-pound dough pieces. When the divider is run empty without any compression of spring 16, the stroke terminates as far forward as the bevelled edge of ram 8 will conveniently permit in reference to the position of the measuring chambers 9 or the die plate, if one is employed.

After the measuring chambers have been charged they move away to deliver the measured dough pieces (which fall on the conveyor 29) and then return to position. During that period the knife and ram are at rest, but the contour of the main cam 19 is such as to relieve the compression of the spring on the ram before the knife is drawn back, permitting the sliding collar 13 to come into contact with a fixed collar 24 on the rod and preventing any further forward movement of the ram due to the pressure of the spring, thus leaving the main ram lever 10 and its components at rest before being moved back by the knife cam 26. The knife cam 26 causes the knife to be drawn back (taking with it the ram through the engagement of the lug 22 and stop 23) to the initial or starting position. The simultaneous return of the knife and ram avoids dead suction effects being produced by the ram and avoids the ram operating to suck the dough down through a relatively small opening, (wire drawing), as the knife uncovers the dough such as would occur if the ram returned before the knife.

Having thus described our invention, what we claim and desire to secure by Letters Patent is:

1. In a divider having a ram chamber and a reciprocatable ram in said chamber, in combination, a stationary hopper, a knife reciprocatable between the hopper and the ram, a flange-like member projecting from the lower end of the hopper inwardly and arranged to present a face adapted to make complete contact with the material in the hopper around said member and thereby provide an air seal between the hopper and the ram chamber, the inner perimeter of the flange member defining the opening into the ram chamber.

2. A dough divider having a dough feed hopper communicating with the ram chamber, wherein the walls of the hopper adjoining the ram chamber are provided with an inwardly projecting flange adapted in conjunction with the dough in the hopper to form an air seal.

3. A dough divider having a dough feed hopper, a reciprocatable knife and a ram, an actuating arm connected to said knife, an articulated arm connected to said ram and including a spring-controlled pressure regulating device for limiting the maximum force exertable by the ram, cam means for oscillating each of said arms, said cam means being shaped and adapted to effect continuous forward movement of the knife and interrupted forward movement of the ram, a portion of such forward movement occurring simultaneously for a substantial distance of the total stroke, said cam means adapted to bring the ram to rest while continuing the forward movement of the knife to the end of its stroke and thereafter completing the ram stroke, said cam shaped to produce a rest period for both knife and ram at the ends of their strokes, and mechanism associated with said ram means for effecting simultaneous return of the ram and the knife to their initial positions.

4. In a dough divider including a cut-off knife located above a charging ram, the combination of a cam-actuated knife lever and a ram actuating lever, said levers being arranged and actuated in relatively timed relation, wherein the ram and knife move together for a substantial proportion of the charging stroke, and then the ram dwells until the knife has cut off the dough from the hopper.

5. A dough divider as claimed in claim 4 wherein the charging stroke of the ram is effected by a cam operating through a spring device associated with an articulated lever and the return stroke of the ram is effected through the knife-actuating means.

LAURENCE SEYMOUR HARBER.
JOHN EDWARD POINTON.